United States Patent [19]

Kurtz et al.

[11] Patent Number: 4,481,497
[45] Date of Patent: Nov. 6, 1984

[54] TRANSDUCER STRUCTURES EMPLOYING CERAMIC SUBSTRATES AND DIAPHRAGMS

[75] Inventors: Anthony D. Kurtz, Englewood; Joseph R. Mallon, Jr., Franklin Lakes; Timothy A. Nunn, Ridgewood, all of N.J.

[73] Assignee: Kulite Semiconductor Products, Inc., Ridgefield, N.J.

[21] Appl. No.: 437,109

[22] Filed: Oct. 27, 1982

[51] Int. Cl.³ ............................ G01L 9/06; G01L 1/22
[52] U.S. Cl. ........................................ 338/2; 338/4; 338/3; 73/766; 73/721; 73/708; 73/756; 29/610 SG
[58] Field of Search ........................ 338/2-5, 338/42, 308, 334; 73/720, 721, 726, 727, 708, 756, 766, DIG. 4; 29/610 SG

[56] References Cited

U.S. PATENT DOCUMENTS

| | | | |
|---|---|---|---|
| 3,475,712 | 11/1967 | Brown | 338/2 |
| 3,527,099 | 9/1970 | Herceg | 338/3 |
| 3,968,466 | 7/1976 | Nakamura et al. | 338/42 |
| 4,079,508 | 3/1978 | Nunn | 338/2 X |
| 4,127,840 | 11/1978 | House | 338/4 |
| 4,264,889 | 4/1981 | Yamamoto et al. | 338/3 X |
| 4,311,980 | 1/1982 | Prudenziati | 338/2 X |
| 4,317,126 | 2/1982 | Gragg | 338/4 X |
| 4,399,707 | 7/1983 | Wamstad | 73/721 |

OTHER PUBLICATIONS

Vaganov et al., "Integral Silicon Pressure Transducer With Trimming Resistors on the Crystal", From Izmeritel'naya Teknika, No. 5, pp. 28-30, May 1980.
Esashi et al., "Fabrication of Catheter-Tip & Sidewall Miniature Pressure Sensors, IEEE Transaction on Electron Devices, vol. ED-29, No. 1, Jan. 1982, pp. 57-63.
Dupont Publication "Screen Printed Hybrid Integrated Circuitry", Electrochemicals Dept., Oct. 1965, pp. 1-12.

Primary Examiner—C. L. Albritton
Assistant Examiner—C. N. Sears
Attorney, Agent, or Firm—Arthur L. Plevy

[57] ABSTRACT

A hybrid transducer employing a ceramic substrate having on a surface a suitable geometry for defining an active or clamped area, a semiconductor strain gage is positioned on said substrate within said active area and connections are made to said gage by conductors printed on said substrate by thick or thin film techniques. Thick film printing techniques or thin film deposition techniques are employed to print the conductors, terminal areas, compensating resistors and stop members.

13 Claims, 5 Drawing Figures

TRANSDUCER STRUCTURES EMPLOYING CERAMIC SUBSTRATES AND DIAPHRAGMS

BACKGROUND OF INVENTION

This invention relates to pressure transducers in general and more particularly relates to a pressure transducer apparatus utilizing ceramic substrates or other insulating diaphragms.

The prior art is replete with a number of patents and articles describing various types of pressure transducers for various applications.

Essentially, a widely used type of transducer employs a piezoresistive sensing element or elements which are semiconductor resistors. The piezoresistive effect is well known and semiconductor resistors, when mounted on a suitable diaphragm exhibit a change in resistance in accordance with a change in pressure or force applied to the diaphragm. In regard to such devices the prior art has employed metal and semiconductor diaphragms onto which a piezoresistive element is either mounted or diffused to form suitable transducer structure. Many examples of such structures exist in the prior art and reference is made to U.S. Pat. No. 3,654,579 entitled "ELECTROMECHANICAL TRANSDUCERS AND HOUSINGS" issued on Apr. 4, 1972 to A. D. Kurtz et al and assigned to the assignee herein.

The prior art has also used ceramic materials such as alumina as diaphragms for piezoresistive transducers. According to such techniques, it has been determined that thick film resistors exhibit the piezoresistive effect. In regard to these devices the thick film resistors are deposited on a ceramic diaphragm by means of conventional techniques employed in thick film technology. Based on these techniques, a thick film resistor is screened and fired in a ceramic substrate. These resistors exhibit the piezoresistive effect and in conjunction with the ceramic substrate form transducer structures.

An example of a thick film pressure sensor employing such techniques may be had by referring to U.S. Pat. No. 4,311,980 entitled "DEVICE FOR PRESSURE MEASUREMENT USING A RESISTOR STRAIN GAGE": by M. Prudenziati issued on Jan. 19, 1982.

In any event, based on modern technology, there is a need for a pressure transducer which is extremely reliable in operation and which exhibits a linear operation and small deviations in sensitivity and null offset over a wide range of temperature. It is a further requirement that such transducers have high voltage isolation and further be relatively immune to adverse environmental conditions. Such requirements are needed, for instance, in biomedical transducers such as blood pressure transducers where the transducer must operate in a saline media and be safely employed in the presence of the very high voltages (7,500 v or more) caused by defibrilators. Moreover, leakage currents must be on the order of microamps or less for safety measures. Finally, it is extremely desirable for such a transducer to be disposable and this requirement imposes the need for very low costs of manufacture. This specification addresses a transducer specifically capable because of its novel construction of addressing these and other needs.

A major problem which exists with ceramic transducer as above indicated is the fact that the resultant structures have limited temperature operation. Such limited temperature operation is the result of well known drift. This instability of thick film resistors is due to aging effects, stress relief and plastic flow of the glossy composition of the resistors, electromigration and other effects. Further, such transducers are subjected to breaking or rupturing upon application thereto of large forces and pressures. This is because thick film piezoresitors typically exhibit relatively low gage factors of about 10. Thus, to achieve a satisfactory output operating strain levels are typically high, associated with large applied forces. Semiconductor piezoresistors on the other hand have gage factors of 100 or greater, thus operating strain levels can be reduced.

Diffused silicon piezoresistive transducers are also well known in the prior art. Such transducers also exhibit temperature range due to degradation of P-N junctions employed in their fabrication. Exotic and expensive techniques such as dielectric isolation, silicon or saphire, etc. must be employed to extend their operation. Moreover, such transducers, while very economical to fabricate in small sizes, are very expensive if a large area diaphragm is to be employed. Large area diaphragms are desirable for low pressure applications and also for reducing dependence of output levels on small variations in diaphragm thickness.

Typically, transducers require compensating and normalizing resistors and interconnecting structures. It is an object of the present invention to describe a structure where these elements are economically fabricated integral to the transducer structure by conventional thin and/or thick film techniques.

It is therefore a further objective of the present invention to provide a hybrid pressure transducer which uses a ceramic substrate as a diaphragm and employs silicon piezoresistive devices as the sensing elements. In regard to such structures, one therefore provides an extremely reliable transducer structure which possesses improved stability and linearity over a wide range of temperature and pressure. The resultant hybrid transducer also possesses excellent characteristics in regard to high voltage and high pressure operations and moreover can be manufactured at low cost even if large area diaphragms are required.

BRIEF DESCRIPTION OF THE PREFERRED EMBODIMENT

A pressure transducer comprising a planar member fabricated from a ceramic material and having on a surface thereof a geometry suitable for defining an active diaphragm area; a semiconductor strain gage is secured on a surface and located within said active area; terminal means printed on said surface containing said strain gage, said terminal means deposited on said surface by a thick or thin film technique, conductor means deposited on said substrate by a thick or thin film technique interconnecting said strain gage with said terminal areas.

DETAILED DESCRIPTION OF THE FIGURES

Figure 1:
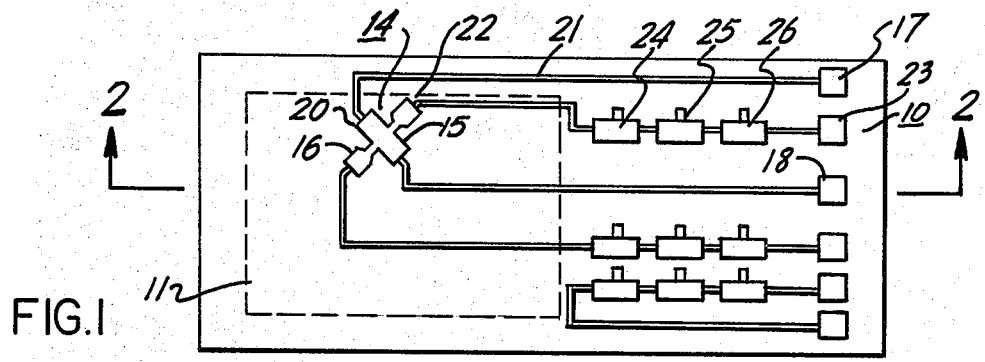
FIG. 1 is a top plan view of a transducer employing a ceramic substrate according to this invention.

Referring to FIG. 1, there is shown a ceramic substrate 10. The substrate 10 is fabricated from a ceramic material such as alumina or other appropriate insulating materials. Essentially, alumina based ceramics are widely employed in thick film applications. The alumina ceramic material used consists mainly of alumina with a small percentage of calcia, magnesia and silica or other added materials. These materials give the alumina substrate enough reactivity so that the thick films will bond strongly to the surface. In any event, other ceramic materials such as sapphire, spinel, stearite and additional ceramics can be employed as well. Quartz is also a suitable substrate material. Another interesting material is porcelainized steel. A thin porcelain layer serves as the insulating function while the basic properties are those of steel.

Thick film technology is well developed and a substrate such as 10 which is rectangular in configuration is commercially available and can be fabricated by conventional techniques. It is understood that other geometries such as square, circular, etc. are also suitable. The bottom surface of the substrate 10 is attached to a base plate 30 which contains a rectangular aperture 32 which serves to define the active or clamped area of the transducer assembly. The active area is that area which will deflect more readily upon application of a force to the surface of the transducer. The active area is shown to be rectangular but it may be square or round or of other geometric shapes. The aperture which defines the active area is shown in the baseplate but it may be formed integral to the diaphragm substrate by machining, hot pressing or other techniques. The aperture may be defined in the bonding material used to fuss the diaphragm substrate to the baseplate.

Shown positioned with the active area of the transducer is a strain gage configuration 14. Essentially, the gage shown is a shear gage and is arranged in a cross-like pattern. This gage configuration is well know in the art. Essentially, the gage 14 is a bridge circuit which is fabricated from silicon and has a central arm 15 across which a voltage or current is applied. Integrally formed with the central arm 15 is a horizontal cross arm 16. Operation of the structure is such that when a force is applied to the structure a voltage is induced in the arm 16 which is indicative of the magnitude of the applied pressure or force.

Examples of such a transducer configuration may be had by referring to an article entitled "Semiconductor Stress Transducer Utilizing the Transverse and Shear Piezoresistance Effects" by W. J. Pfann and R. N. Thurston, published in the *Bell System Technological Journal*, 1961. A geometrical layout similar to the one herein employed is shown in U.S. Pat. No. 3,213,681. Shear gage SHEAR GAGE PRESSURE MEASURING DEVICE issued to N. E. Pearson on Oct. 26, 1965.

As will be explained, the shear gage 14 is fabricated from silicon and is then secured to the ceramic substrate by means of a glass bond. The bond between the substrate 10 and the gage 14 may be afforded by many techniques which include anodic bonding, glass frit bonding, diffusion bonding, and so on. The gage is fabricated from silicon, which possesses improved thermal stability, as compared to thick film resistors and other types of sensor configurations.

It should be noted that the gage is fabricated separately from the transducer structure by the means of semiconductor integrated circuit processing. The fact has many important implications. First, the theoretical understanding of the conduction of piezoresistance phenomena in silicon is well known and considerable art exists for precise and repeatable control. Piezoresistance in thick films is a newer phenomena, depends on precise stoiochometric control and good control of firing conditions and thus the piezoresistive effort is difficult to control and subject to process variations in the manufacture of the ceramic device and the thick film inks employed to form the resistors.

Moreover, the described embodiment is very advantageous over diffused silicon transducer structures because very little expensive silicon "real estate" is employed. Typical silicon diffused transducer structures are 3 m-m square while typical shear or gage structures are 0.5 m m square. Thus, 36 times less silicon wafer area is typically employed, moreover, the fabrication process is simple. Thus the sensitive elements are very cheap comparatively.

The flexure element is ceramic which is also very inexpensive and compensating resistors are very readily and inexpensively integrated into the transducer structure by known techniques. Essentially, the overall manufacturing process has been maximized by batch fabricating the smallest possible size the sensing element while producing said sensing element with the superior performance achievable in a semiconductor piezoresistor.

As shown in FIG. 1, the shear gage 14 has four terminals. Appropriate terminals of the gage are coupled to peripheral terminals deposited on the ceramic substrate by thick film techniques. Several appropriate techniques can be used for interconnection. For instance, ultrasonic bonding of gold wires, soldering or overlaying of the printed conductors on the gage structure are all readily employed to achieve a reliable inexpensive interconnection.

In a similar manner the leads which are directed from the gage 14 to the terminal areas are also printed on the substrate by thick or thin film techniques. As shown in FIG. 1, the terminal 20 of the shear gage 14 is directed via conductor 21 to the outer terminal 17. In the fabrication compensating resistors which are thick film devices are also depositied on the substrate 10 using thick film technology. Thus, terminal 22 of the shear gage 14 is directed to terminal 23 via the series resistance chain including resistors 24, 25, and 26. These resistors are known in the prior art and are designated as "top hat" resistors. As is known, there is a need to provide resistive compensation for a shear gage such as 14. By providing suitable resistor compensation one can normalize the gage so that it possesses good linearity and mimimum drift of sensitivity and null over a wide range of temperature and pressure. An example of compensating techniques for the shear gage 14, depicted in FIG. 1, may be had by referring to U.S. Pat. No. 4,442,717 to A. D. Kurtz et al, issued on Apr. 18, 1984 and entitled "COMPENSATION AND NORMALIZATION OF APPARATUS FOR SHEAR PIEZORESISTIVE GAGE SENSORS" and assigned to the assignee herein.

An important aspect of the present invention is that the conductors as 21 and the various resistors as 24, 25, and 26, as well as the end terminals as 17 and 23 are provided by thin or thick film techniques. Thus, these components are readily, reliably and economically fabricated.

In thick film technology conductors are applied as a paste-like, organic-metal-glass mixture called inks or paste. In such operations the organic materials are added to give prefiring strength to the mixture and to control the flow. The organic base holds the dried flim to the ceramic substrate until it is fired. The glass is chosen partly for its melting point and lead borosilicate glasses are commonly used. The metals used for the thick film conductors must withstand the high temperatures needed and such metals are normally the noble metals such as platinum, palladium, gold and silver as well as various alloys of these metals. The resistors and resistor compositions may be formed from a variety of materials. Such resistors normally possess the same characteristics as the conductors. In regard to the formation of the resistors on ceramic substrates there are many well-known techniques, and many companies sell resistor paste for use in forming resistors in conjunction with ceramic substrates. On the other hand, these conductors and resistors may be fabricated by thin film techniques. Materials such as alumina, gold, platinum, etc. are suitable for conductors while materials such as nichrome and chrome-silicon are suitable for resistors. Fabrication techniques include vacuum deposition, sputtering electron beam deposition and chemical vapor deposition among others.

According to the above, there is then shown a transducer structure which utilizes a semiconductor bridge arrangement formed on a ceramic substrate and within an active area. The resistors which are used for temperature and pressure compensation as well as all conductors emanating from the semiconductor structure are formed by thick or thin film techniques as explained. It is, of course, understood that the thick film technology is well known. For suitable examples of such technology reference is made to a text entitled "THICK FILM HYBRID MICROCIRCUIT TECHNOLOGY" by D. W. Hamer and James V. Biggers, published in 1972 by John Wiley and Sons, Inc. For a suitable example of thin film technology, see, "MICROELECTRONICS" by Fogiel, (1968) REA.

Figure 2:
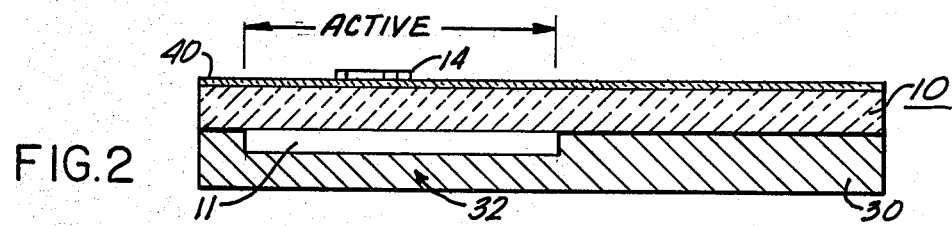
FIG. 2 is a cross-sectional view taken through line 2—2 of FIG. 1.

Referring to FIG. 2, there is shown a cross-sectional view of the transducer assembly according to FIG. 1. As indicated, the substrate 10 is fabricated from a ceramic or other suitable material and has an active 32 area shown by the dotted line within which is mounted the semiconductor gage 14. The ceramic substrate is then secured by means of a glass bond to a rigid support base 30. The base 30 contains a rectangular aperture 32 which defines the active area of the transducer. The base 30 is used for mounting the transducer and may be fabricated from a suitable ceramic, metal or semiconductor material. The substrate 10 is secured to the base member 30 by means of a glass bond or other conventional technique such as epoxy.

The resultant structure as above described is extremely simple to fabricate and possesses excellent high voltage characteristics. As is known, conventional ceramic substances such as alumina have excellent high voltage responses as they are excellent insulators. In this manner the resultant transducer structure is capable of withstanding high voltage without damage due to the high dielectric constant of the ceramic. In this manner the resultant transducer can be employed as a medical transducer where such attributes are necessary.

It has been found that care must be taken in choosing the material employed for the diaphragm. Thus, film quality ceramic substrates with a relatively fine grained struture of 1 to 5 microns have been experimentally found to be superior in voltage breakdown and ultimate strength.

In fabrication of such devices, the ceramic substrate 10 is prepared. The resistor and conductor patterns are then printed or screened on the ceramic substrate by conventional thick film techniques. After formation of the conductor and resistor patterns, a layer of glass 40 is deposited on the surface of the ceramic substrate. The layer of glass may be deposited thereon by a sputtering technique or other techniques. The semiconductor gage is formed by a separate process and then bonded to the glass layer by means of a diffusion or anoidic bonding technique. The exact order of these manufacturing steps is a matter of convenience. Examples of the formation glass backed transducers or separate sensing devices can be had by referring to U.S. Pat. No. 3,868,719 entitled "THIN RIBBON-LIKE GLASS BACK TRANSDUCERS" issued on Feb. 25, 1975 to A. D. Kurtz et al and assigned to the assignee herein. Other pertinent techniques are shown in U.S. Pat. No. 3,951,707 entitled "METHOD OF FABRICATING GLASS BACK TRANSDUCERS AND GLASS BACKED STRUCTURES" issued on Apr. 20, 1976 to A. D. Kurtz et al and assigned to the assignee herein. Such transducer structures may employ diffused bridges or monolithic multielement filmenary structures may be used. A monolithic semiconductor shear gage is shown as the preferred embodiment. A particularly convenient way of attaching the gage to the diaphragm is by means of a silk screened intermediate glass layer but other means such as epoxy may be employed.

These patents also describe typical bonding techniques which will bond a semiconductor structure to a glass base. The contacts or terminals of the semiconductor configuration are then connected to the terminal areas on the ceramic substrate.

Figure 3:
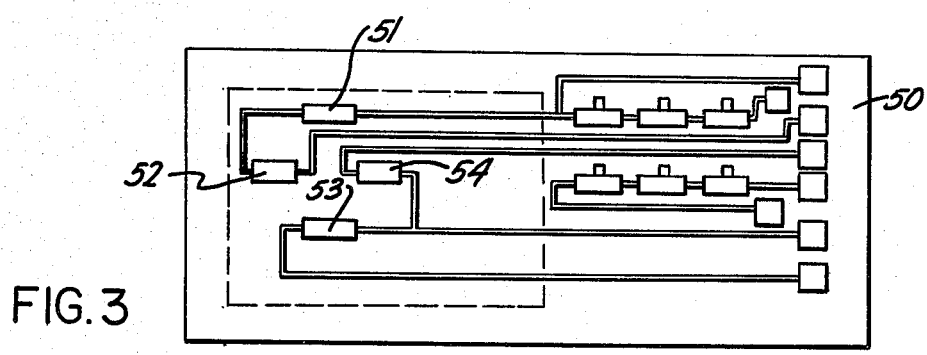
FIG. 3 is a top plan view of an alternate embodiment of a transducer structure according to this invention.

Referring to FIG. 3, there is shown a top plan view of an alternate embodiment of ceramic based transducer 50. Essentially, the structure shown in FIG. 3 is similar to the structure in FIG. 1 with the exception that four separate piezoresistive devices as 51, 52, 53 and 54 are positioned in the active area. The piezoresistive devices are single semiconductor elements which have been prefabricated from silicon. These devices are arranged within the active area with two outer peripheral devices as 51 and 53 and two central devices as 52 and 54. Each device is brought out to respective terminals by using thick film conductors as above described. The semiconductor devices which are piezoresistors are then interconnected to form a Wheatstone bridge array. This array is a conventional circuit configuration and is well known in the transducer art. As can be seen from FIG. 3, various resistors of the "top hat" configuration are also formed on the ceramic substrate by thick film techniques. The "top hat" resistor is a particularly useful configuration in that the resistance value can be trimmed by various well known techniques by the use of a laser or sandblasting apparatus to adjust resistance values and therefore to provide the proper compensating values for the piezoresistive array.

Figure 5:
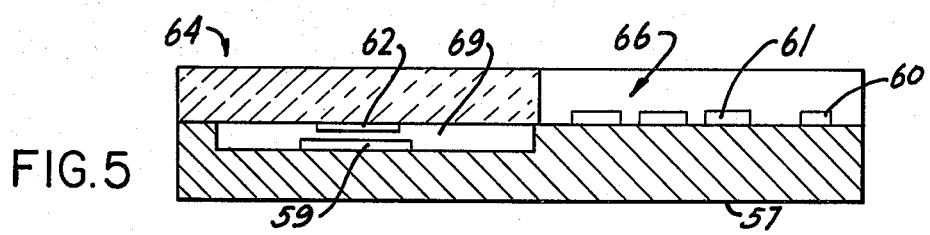
FIG. 5 is a cross-section of FIG. 4 taken through line 5—5.
Figure 4:
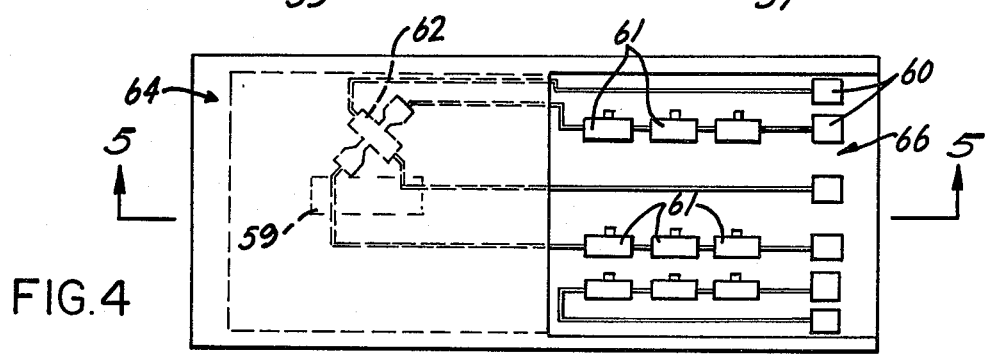
FIG. 4 is a top plan view of another alternate embodiment.

There is shown in FIG. 4 a plan view of another embodiment of the present invention. A base plate 64 with a "u" shaped aperture 66 is bonded to the diaphragm substrate 57. FIG. 5 is a cross-sectional view of this structure through line 5—5. The active area 67 is defined by an aperture 68 in the intermediate bonding layer 58 which is used to attch the baseplate to the substrate. A boss 59 is formed simultaneously with the intermediate layer but is contrived to be of a thinner vertical dimension. If the said intermediate layer is for instance of screened glass the boss 59 may be a single screened thickness while the bonding layer 58 may be doubly screened. Such a technique can reliably provide a gap 69 of 0.5 mils. If a force is applied to the diaphragm substrate 57 then travel in the upward direction is limited to the dimension of the gap and an overpressure stop is formed. Shear gage 62, resistors 61 and terminals 60 are similar to previous embodiments. A shaped aperture 66 provides access to the resistors and terminals. It is seen that a sealed pressure reference cavity 68 is formed by this structure. An additional aperature may be added to baseplate 64 if gage or differential operation is required.

The above embodiments are representative of the invention but are not intended to limit the invention. One skilled in the art can readily achieve variations in the structure. For instance, the diaphragm may be convoluted or of a "picture frame configuration". Apertures and stops may be employed in the diaphragm, base plate, intermediate layer or any combination thereof. The center boss in a "picture frame" structure may be of appropriate thickness to provide a stop. Other modifications are also apparent to those skilled in the art.

In regard to the above configuration, the hybrid transducer indicated is extremely simple to manufacture while possessing excellent temperature and pressure operation as above indicated. The transducer structure employs rectangular substrate as well as rectangular apertures, and, based on such factors, the machining of the ceramic is easily implemented. The structure further possesses a protective layer of glass which thereby protects the printed ink terminals and resistance elements. Another layer of glass further allows one to firmly secure the semiconductor sensor to the final structure. These and many other modifications and alterations are deemed to be encompassed within the spirit and scope as defined by the claims appended hereto.

We claim:

1. A hybrid pressure transducer, comprising:
   a planar member fabricated from a ceramic material and having a section thereof defining an active area,
   a semiconductor strain gage secured on a surface of said planar ceramic member within said active area, said gage positioned closer to one edge of said planar member within said area and being of a "cross-like" construction manifesting a shear gage,
   terminal means printed on said surface containing said strain gage, said terminal means printed on said surface by a thick film technique employing a conductive organic ink,
   conductor means printed on said surface by a thick film technique for interconnecting said strain gage with said terminal means,
   resistor means printed on said surface by a thick film technique for providing means for compensating said strain gage wherein said semiconductor strain gage is separately fabricated and subsequently attached to said planar member by an insulating bonding layer.

2. The hybrid pressure transducer according to claim 1 further comprising:
   a base plate secured to said planar member at a surface opposite to that containing said strain gage, said base plate having a rectangular aperture defining said active area.

3. The hybrid pressure transducer according to claim 2, further including,
   stop means formed on said base plate within said active area and operative to limit the movement of said ceramic member when a force is applied to a surface thereof.

4. The hybrid pressure transducer according to claim 3, wherein said stop means are printed by the use of an organic ink employing a thick film technique.

5. The pressure transducer according to claim 1, further including at least one depending boss located on a given surface to provide a stop for said ceramic planar member when a force of a given magnitude is applied to said surface containing said strain gage.

6. The pressure transducer according to claim 1, wherein said semiconductor strain gage is secured to said surface by means of a glass bond.

7. The pressure transducer according to claim 6, wherein said glass bond is produced by a silk screened method.

8. The pressure transducer according to claim 1, wherein said semiconductor strain gage is a shear gage of a "cross like" configuration.

9. The pressure transducer according to claim 1, wherein said planar ceramic member is fabricated from alumina.

10. A hybrid pressure transducer, comprising:
    a rectangular planar member fabricated from a ceramic material
    a base plate member of a congruent rectangular configuration secured to said planar member at one surface thereof, said based plate member having a rectangular aperture facing said planar ceramic member and defining an active area to enable deflection of said ceramic member when a force is applied to an opposite surface,
    a semiconductor strain gage mounted on said ceramic member on the opposite surface and within said active area,
    terminal means printed on said surface containing said gage, said terminal means printed thereon by a film technique,
    conductor means printed on said surface by a film technique interconnecting said strain gage with said terminal means wherein the said semiconductor strain gage is separately fabricated and subsequently attached to said planar member by an insulating bonding layer.

11. The hybrid pressure transducer according to claim 10, further including:
    resistor means printed on said surface containing said gage for providing means for compensating said gage.

12. The hybrid pressure transducer according to claim 11, wherein said terminal means, said conductor means and said resistor means are printed on said ceramic substrate by a thick film technique employing an organic ink.

13. The hybrid pressure transducer according to claim 10, wherein said planar ceramic member is alumina.

* * * * *